Patented Dec. 29, 1942

2,306,552

UNITED STATES PATENT OFFICE 2,306,552

PROCESS FOR THE MANUFACTURE OF KETOLS OF THE CYCLOPENTANOPOLY-HYDROPHENANTHRENE SERIES AND DERIVATIVES THEREOF

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application November 10, 1939, Serial No. 303,910. In Switzerland November 19, 1938

4 Claims. (Cl. 260—397.4)

It has been found that ketols of the cyclopentanopolyhydrophenanthrene series and the derivatives thereof are obtained by condensing carboxylic acid halides of the said series with metal derivatives of reactive methylene compounds which contain at the reactive methylene group a substituent capable of being converted into a hydroxyl group, treating the condensation product with hydrolysing agents, heating any liberated acids, and, if required, converting in any stage of the reaction, the substituent convertable into a hydroxyl group into a free, esterified or etherified hydroxyl group.

As parent substances there are used carboxylic acid halides of the saturated and unsaturated cyclopentanopolyhydrophenanthrene series, which may be substituted in any manner, and may belong to any steric configuration. Thus, for example, use may be made of $\Delta^5$-3-acyloxy-etiocholenic acid halides, $\Delta^4$-3-keto-etio-cholenic acid halides or their enol derivatives, or corresponding compounds of the cholenic acid series, acid halides of 3:17-dihydroxy-etiocholenic acid or its derivatives, and many others.

The following compounds for example are suitable according to the present process for the reaction with the carboxylic acid halides: metal derivatives, such as alkali or magnesium derivatives of malonic esters, malonitriles, malonic amide, analogous cyanoacetic acid and acetoacetic acid derivatives, which at the reactive methylene group contain besides the metal atom a substituent capable of being converted into a hydroxyl group. Such a substituent may be, for example, a hydroxyl group esterified by an organic or inorganic acid or an etherified hydroxyl group. In the second stage of the reaction the condensation products thus obtained are treated with hydrolysing agents, whereby especially ester, nitrile, amido, or acyl groups present are saponified. If required, the resulting liberated acids are heated in substance, in neutral or acid solution or suspension, for the purpose of decarboxylation. Finally, the substituent convertible into a hydroxyl group may be converted in any stage of the reaction, and in a manner itself known into a free, esterified or etherified hydroxyl group.

The products of the new and simple process for the manufacture of compounds containing an $\alpha$-keto-alcohol grouping in the side chain are therapeutically active or may be converted into therapeutically active compounds.

*Example*

A suspension of 2 parts of sodium chloromalonic acid diethyl ester (prepared, for example, by reaction of chloromalonic acid diethyl ester with sodium alcoholate and precipitation with ligroin) in 50 parts of benzene is allowed to react with a solution in benzene of 4 parts of $\Delta^{5:6}$-3-acetoxy-etiocholenic acid chloride until the reaction is complete. The reaction mixture is then poured into water, the layers are separated and the benzene solution is washed with water, dried and evaporated. The residue is saponified with alkali in a very cautious manner, e. g., by means of bicarbonates or carbonates, then acidified and heated in order to split off carbon dioxide. The reaction product is taken up in ether, the ethereal solution washed with dilute soda solution and water, dried, and evaporated. The $\Delta^{5:6}$-pregnene-3,21-diol-20-one is obtained from the residue by recrystallization, chromatographic absorption or by means of condensation products with carbonyl or carbinol reagents. Instead of the simultaneous saponification of the ethyl ester groups into carboxylic acid groups and the chloro group into the hydroxyl group the chloro group may advantageously first be converted into an acyloxy group by means of carboxylic acid salts and then saponified together with the other ester groups.

In place of a halogenated metal malonic acid derivative use may be made, for example, of alkoxy- or acyloxy-metal malonic acid-derivatives or acetoacetic acid-derivatives, like their esters, nitriles or amides. Instead of the sodium derivative also the other alkali metals or for example magnesium are suitable.

As parent substances, for example, corresponding 3-keto-acid halides may also serve. Thus, for example, the known $\Delta^{4:5}$-pregnene-21-ol-3:20-dione is obtained.

What we claim is:

1. A process for the manufacture of ketols of the cyclopentanopolyhydrophenanthrene series and the derivatives thereof, comprising condensing a compound of the said series which bears in 17-position a side chain containing a carboxylic acid halide radical with metal derivatives of reactive methylene compounds which contain at the reactive methylene group a substituent capable of being converted on hydrolysis into a carboxyl group and a monovalent substituent capable of being converted on hydrolysis into a hydroxyl group, and treating the condensation product with hydrolysing agents.

2. A process for the manufacture of ketols of the cyclopentanopolyhydrophenanthrene series and the derivatives thereof, comprising condensing a compound of the said series which bears in 17-position a side chain containing a carboxylic acid halide radical with metal derivatives of reactive methylene compounds which contain at the reactive methylene group a substituent capable of being converted on hydrolysis into a carboxyl group and a monovalent substituent capable of being converted on hydrolysis into a hydroxyl group, treating the condensation product with hydrolysing agents, and heating the liberated acids produced.

3. A process as claimed in claim 2, wherein in any stage of the reaction the substituent convertable on hydrolysis into a hydroxyl group is converted into a member of the group consisting of a free, an esterified and an etherified hydroxyl group.

4. A process for the manufacture of ketols of the cyclopentanopolyhydrophenanthrene series and the derivatives thereof, comprising condensing a compound of the said series which bears in 17-position a side chain containing a carboxylic acid halide radical with a member of the group consisting of alkali metal derivatives of halogenated, acyloxy- and alkoxy-malonic esters, malonic amides and malonitriles.

KARL MIESCHER.
ALBERT WETTSTEIN.